(12) United States Patent
Moon

(10) Patent No.: US 7,581,104 B2
(45) Date of Patent: Aug. 25, 2009

(54) IMAGE WATERMAKING METHOD USING HUMAN VISUAL SYSTEM

(75) Inventor: Ji-young Moon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 689 days.

(21) Appl. No.: 10/713,197

(22) Filed: Nov. 17, 2003

(65) Prior Publication Data
US 2004/0230802 A1 Nov. 18, 2004

(30) Foreign Application Priority Data
May 15, 2003 (KR) ...................... 10-2003-0031018

(51) Int. Cl.
*H04L 9/32* (2006.01)
*G06F 7/04* (2006.01)
*H04N 7/167* (2006.01)

(52) U.S. Cl. .................... 713/176; 726/32; 380/201

(58) Field of Classification Search ................ 713/176; 726/32; 380/201
See application file for complete search history.

(56) References Cited

U.S. PATENT DOCUMENTS

| 5,706,290 | A | * | 1/1998 | Shaw et al. ................. 370/465 |
| 5,809,139 | A | * | 9/1998 | Girod et al. ................. 380/202 |
| 5,983,176 | A | * | 11/1999 | Hoffert et al. ............... 704/233 |
| 6,028,608 | A | * | 2/2000 | Jenkins ....................... 345/619 |
| 6,061,793 | A | * | 5/2000 | Tewfik et al. ............... 713/176 |
| 6,185,312 | B1 | * | 2/2001 | Nakamura et al. .......... 382/100 |
| 6,310,962 | B1 | * | 10/2001 | Chung et al. ................ 382/100 |
| 6,332,030 | B1 | * | 12/2001 | Manjunath et al. .......... 382/100 |
| 6,373,960 | B1 | * | 4/2002 | Conover et al. ............. 382/100 |
| 6,421,445 | B1 | * | 7/2002 | Jensen et al. ................ 380/253 |
| 6,442,283 | B1 | * | 8/2002 | Tewfik et al. ............... 382/100 |
| 6,535,617 | B1 | * | 3/2003 | Hannigan et al. ........... 382/100 |
| 6,556,689 | B1 | * | 4/2003 | Xia et al. .................... 382/100 |
| 6,606,393 | B1 | * | 8/2003 | Xie et al. .................... 382/100 |
| 6,674,876 | B1 | * | 1/2004 | Hannigan et al. ........... 382/100 |
| 6,711,276 | B1 | * | 3/2004 | Yoshiura et al. ............. 382/100 |
| 6,810,131 | B2 | * | 10/2004 | Nakagawa et al. .......... 382/100 |
| 6,915,000 | B1 | * | 7/2005 | Tanaka ....................... 382/100 |
| 6,928,165 | B1 | * | 8/2005 | Takai ......................... 380/201 |

(Continued)

OTHER PUBLICATIONS

Digital Watermarking Applied to MPEG-2 Coded Video Sequences Exploiting Space and Frequency Masking Simone Arena, Marcello Caramma, Rosa Lancini Cefriel Via Fucini 2, Milano, I-20133, Italy Tel. +39 02 23954-209, Fax. +39 02 23954-254{ arena,marcello,rosa} @cefriel.it.*

*Primary Examiner*—Emmanuel L Moise
*Assistant Examiner*—Techane J Gergiso
(74) *Attorney, Agent, or Firm*—Sughrue Mion, PLLC

(57) ABSTRACT

A moving image watermarking method, which forms a global masking map by combining frequency masking, spatial masking and motion masking values together and inserts a watermark according to the formed global masking map through the use of a human visual system is provided. In the moving image watermarking method, a watermark value is obtained by exclusive-ORing a random key value and a binary value of a logo image. A plurality of masking operations are separately performed. A global masking value is obtained through the separate masking operations. A watermarked frame value is obtained by adding a watermark value weighted by the global masking value and a control variable to an original frame value.

9 Claims, 6 Drawing Sheets

U.S. PATENT DOCUMENTS

| | | | |
|---|---|---|---|
| 6,954,549 B2 * | 10/2005 | Kraft | 382/167 |
| 6,957,350 B1 * | 10/2005 | Demos | 380/203 |
| 6,975,743 B2 * | 12/2005 | Venkatesan et al. | 382/100 |
| 6,978,370 B1 * | 12/2005 | Kocher | 713/176 |
| 7,006,568 B1 * | 2/2006 | Gu et al. | 375/240.11 |
| 7,035,700 B2 * | 4/2006 | Gopalan et al. | 700/94 |
| 7,043,019 B2 * | 5/2006 | Tehranchi et al. | 380/218 |
| 7,046,818 B2 * | 5/2006 | Ratnakar et al. | 382/100 |
| 7,073,065 B2 * | 7/2006 | Stone | 713/176 |
| 2001/0019618 A1 * | 9/2001 | Rhoads | 382/100 |
| 2003/0033529 A1 * | 2/2003 | Ratnakar et al. | 713/176 |
| 2003/0091189 A1 * | 5/2003 | Rhoads | 380/252 |

* cited by examiner

FIG. 1
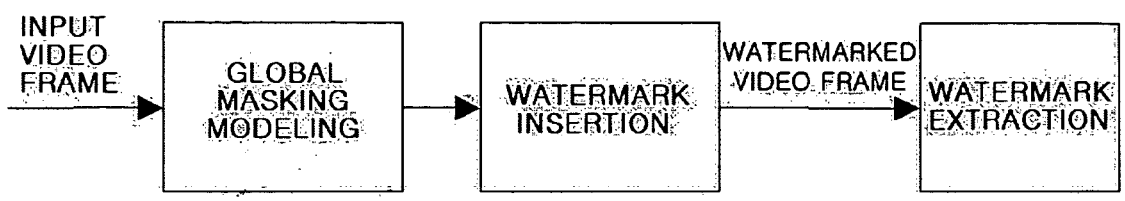
FIG. 2A
FIG. 2B
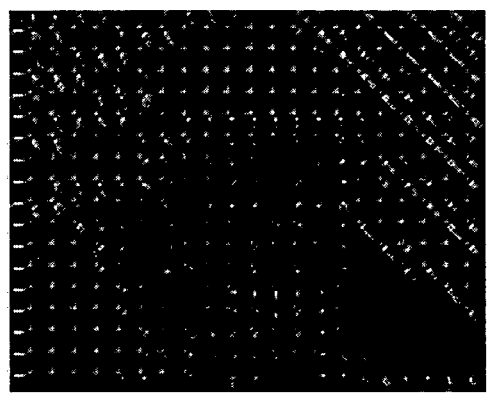

FIG. 3A
FIG. 3B
FIG. 4

FIG. 7A  FIG. 7B  FIG. 7C  FIG. 7D
   
FIG. 8A  FIG. 8B
 
FIG. 8C

IMAGE WATERMAKING METHOD USING HUMAN VISUAL SYSTEM

BACKGROUND OF THE INVENTION

This application claims the benefit of priority from Korean Patent Application No. 2003-0031018 filed on May 15, 2003 in the Korean Intellectual Property Office by claiming exemption of loss of novelty, the disclosure of which is incorporated herein by reference.

Field of the Invention

The present invention relates generally to a moving image watermarking method, and more particularly to a method, which forms a global masking map by combining frequency masking, spatial masking and motion masking values together and inserts a watermark according to the formed global masking map through the use of a human visual system.

Description of the Related Art

Recently, copyright protection has become a hot issue due to the rapid increase in the use of digital data. For methods of solving copyright protection problems, a digital watermarking method is used. The digital watermarking method can solve problems, such as the illegal reproduction of digital data, by inserting specific information, a watermark, into data and detecting the specific information if necessary. Generally, this watermarking method must satisfy certain requirements, such as invisibility, robustness and security. Especially, a moving image watermarking method must be robust against various types of moving image compression methods and variations of bit rates.

Of conventional watermarking methods, a method of inserting a watermark into a Moving Picture Expert Group (MPEG)-2 bit stream cannot be applied to various bit rates or encoding methods, and is limited in the capacity of insertable watermark data due to a limitation in the bit rate thereof. Further, a conventional method, in which a still image watermarking method is applied to a moving image watermarking method as it is, is problematic in that it does not take a correlation and motion change between moving image frames into consideration. In the watermarking method, since it is important to maintain the invisibility of a watermark while maintaining the robustness thereof, a Human Visual System (HVS) has been generally used to insert a watermark into a region less sensitive to human eyes. Meanwhile, the conventional methods mainly use frequency masking characteristics to insert a watermark into a Discrete Cosine Transform (DCT) domain. However, since these methods do not consider spatial localization characteristics, a watermark inserted into the DCT domain is spread over all frames, which causes a problem in that a watermark can even be inserted into a region with an insufficient masking effect, such as a uniform region.

SUMMARY OF THE INVENTION

Accordingly, the present invention has been made keeping in mind the above problems occurring in the prior art, and an object of the present invention is to provide a watermarking method, which satisfies invisibility, robustness and security while inserting a watermark into the original moving image data, not compressed, so as to perform universal watermarking regardless of various encoders, bit rates and the like.

Another object of the present invention is to provide a watermarking method, which inserts a watermark into a moving image depending on a global masking method in which the characteristics of respective masking methods are combined together in consideration of HVS.

According to an embodiment of the present invention to accomplish the above objects, there is provided a moving image watermarking method using a human visual system comprising the steps of obtaining a watermark value by exclusive-ORing a random key value and a binary value of a logo image; separately performing a plurality of masking operations; obtaining a global masking value through the separate masking operations; and obtaining a watermarked frame value by adding a watermark value weighted by the global masking value and a control variable to an original frame value.

Preferably, the step of separately performing a plurality of masking operations comprises the steps of performing a spatial masking operation; and performing a motion masking operation.

Also preferably, the step of performing a spatial masking operation comprises the steps of adjusting contrast of the moving image frame; and extracting edges from the contrast-adjusted frame.

It is preferable that the step of performing a motion masking operation comprises the steps of obtaining a luminance difference between a current frame and a previous frame; and extracting edges from the current frame.

Further preferably, the step of separately performing a plurality of masking operations further comprises the step of performing a frequency masking operation.

Further preferably, a moving image watermarking method using a human visual system further comprises the steps of: comparing an image quality of the watermarked frame with an image quality set to a target; and decreasing a control variable by a predetermined value if the image quality of the frame is less than the target image quality, and increasing the control variable by a predetermined value if the image quality of the frame is greater than the target image quality.

Further preferably, the image quality is estimated on the basis of Peak-Signal-to-Noise Ratio.

Further preferably, a moving image watermarking method using a human visual system, further comprises the step of extracting the watermark, comprising the steps of: subtracting a watermarked frame value from an original frame value; and exclusive-ORing the subtracted result value and a random variable obtained by a key value, and obtaining the exclusive-ORed result.

According to an embodiment of the present invention to accomplish the above objects, there is provided a spatial masking method, comprising the steps of: adjusting contrast of a moving image frame; and extracting edges from the contrast-adjusted frame.

According to an embodiment of the present invention to accomplish the above objects, there is provided a motion masking method, comprising the steps of: obtaining a luminance difference between a current frame and a previous frame; and extracting edges from the current frame.

According to an embodiment of the present invention to accomplish the above objects, there is provided a recording medium for storing computer programs for executing the method of a moving image watermarking using a human visual system in a format readable by computers, the method comprising: the steps of obtaining a watermark value by exclusive-ORing a random key value and a binary value of a logo image; separately performing a plurality of masking operations; obtaining a global masking value through the separate masking operations; and obtaining a watermarked frame value by adding a watermark value weighted by the global masking value and a control variable to an original frame value.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view showing an entire procedure of a watermarking method according to the present invention;

FIGS. 2A and 2B are views showing the results of frequency masking of the present invention on a test frame;

FIGS. 3A and 3B are views showing the results of spatial masking of the present invention on a test frame;

FIG. 4 is a view showing the results of motion masking of the present invention on a test frame;

FIGS. 7A to 7D are views showing the results of an invisibility test in the watermarking method of the present invention;

FIGS. 8A to 8C are views showing the results of a test of the capacity of insertable watermark data according to the present invention;

Figure 5A:
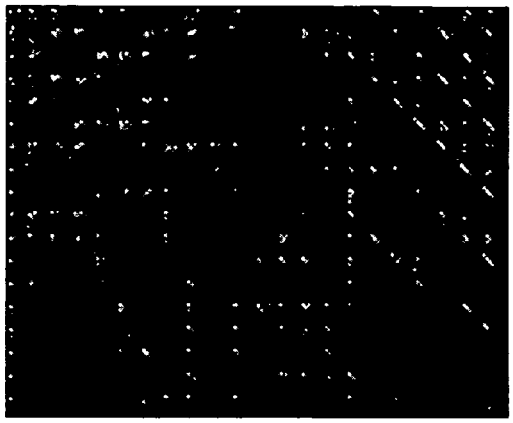
FIGS. 5A and 5B are views showing the results of global masking of the present invention on a test frame.

DESCRIPTION OF ILLUSTRATIVE
NON-LIMITING EMBODIMENTS

In the present invention, a watermark is inserted into original moving image data, not compressed, so as to perform universal watermarking regardless of various encoders, bit rates and the like. Further, in order to insert as much watermark data as possible into moving image frames while not being seen by a user, an HVS is used. FIG. 1 is a view showing an entire procedure of a watermarking method according to the present invention. First, in order to obtain a global masking map of an input moving image frame, the HVS is considered in three aspects, that is, a frequency, a space and a motion, and the results are combined together. At this time, frequency masking is performed so that a frame is Discrete Cosine Transform (DCT)-transformed, and then position information is obtained using a frequency sensitivity table. Spatial masking is performed using an edge detection method after the contrast of an entire image is adjusted using a luminance function. Motion masking is performed using a motion change between consecutive frames. Therefore, a correlation between frames can be taken into consideration. Further, a watermark is produced by combining a random sequence, generated by a key value, and a binary level logo with each other through an exclusive-OR operation thereof, and is applied to a moving image frame according to global masking results. The capacity of insertable watermark data formed by the masking is suitably adjusted by comparing Peak-Signal-to-Noise Ratios (PSNRs) of an original frame and a watermarked frame with each other. A watermark is extracted from the watermarked frame through experiments against MPEG encoding and re-encoding attacks, etc., thus verifying that the method proposed in the present invention is robust. Further, by using global masking, watermark data much greater than that of other conventional methods using the HVS can be inserted.

In the watermarking method, it is important that a watermark maintains invisibility while maintaining robustness. That is, HVS characteristics are used to insert a watermark into regions less sensitive to human eyes. Since HVS characteristics are different according to the frequency, luminance and chrominance information of an image, the capacity of insertable watermark data can be adjusted using these HVS characteristics. The HVS has characteristics as described below. The HVS is less sensitive to high frequency noise components and noise components of regions close to edges. Further, in the case of moving image frames, the HVS is less sensitive to noise of parts moving fast.

A perceptual model is generally described using masking. The masking represents a case in which a certain signal exceeds a visibility threshold for other surrounding signals. That is, the masking is expressed by a phenomenon in that the appearance of a certain signal prevents the presence of another signal from being found. For example, frequency masking represents a phenomenon that the appearance of one frequency hides the perception of another frequency. Therefore, the concept of this masking is applied to a watermarking method, thus enabling a watermark to be effectively and invisibly inserted into original data. Watermarking methods using the HVS have been proposed in a great number of inventions. However, most conventional methods use frequency masking characteristics to insert a watermark into a DCT domain. Such a method does not consider spatial localization characteristics. That is, if only frequency masking is taken into consideration, a watermark inserted into the DCT domain is spread over all frames. As a result, the watermark is inserted into even a region with an insufficient masking effect, such as a uniform region. Therefore, the present invention considers even spatial masking, as well as frequency masking, when watermarking a moving image. Further, the present invention also considers motion masking using characteristics of HVS that the HVS is less sensitive to noise inserted into a region with a motion change between consecutive frames.

Hereinafter, frequency masking is described. The frequency masking used in the present invention is based on a DCT-based visual model of Watson. First, an image is divided into 8×8 blocks, and a masking value is calculated using a frequency sensitivity table. Frequency sensitivity is an experimentally measured quantity, and represents a minimum value of DCT coefficients, which are detected within a corresponding block when masking noise is not applied to the block with respect to each of blocks. Frequency sensitivity shows that, as the minimum value becomes smaller, the HVS is more sensitive to a frequency corresponding to the value. Through these results, it can be understood that a high frequency region is less sensitive to the human sight than a low frequency region.

FIGS. 2A and 2B are views showing a frame obtained by applying frequency masking to an original frame. As shown in FIGS. 2A and 2B, a higher masking value is obtained in a higher frequency region. In the present invention, in order to obtain a global masking map in consideration of spatial masking and motion masking effects, as well as a frequency masking effect, a frequency masking value is inverse-DCT (IDCT) transformed, and then frequency masking position information in a spatial domain is obtained.

Hereinafter, spatial masking is described below. In a method of inserting a watermark in a spatial domain, edges become important. If a watermark is applied to an entire image in the same ratio, the watermark inserted into a uniform region on a texture, that is, a region that has almost uniform intensity, has a tendency to be easily seen compared to a watermark inserted into edges or regions close to the edges. That is, edges of an image have a high masking effect because they can hide signals with intensities higher than any other regions. Therefore, the present invention models spatial masking using characteristics that the HVS is less sensitive to noise of the regions close to the edges.

There are several methods of extracting edges. The present invention uses Sobel edge detection which is the most typical among the several methods. FIG. 3A shows the results obtained by extracting edges using the Sobel edge detection method. As shown in FIG. 3A, it can be seen that even regions, not edges, are extracted in the case where a masking map is formed using a typical edge detection method. That is, it can be seen that even irregular edges on a texture are taken into consideration. Therefore, in order to solve this problem, the present invention adjusts the contrast of an image as a pre-processing step before extracting edges. That is, in order to obtain a masking map with better performance when edges are extracted, the contrast of an image is adjusted and then an edge extraction method is applied to the contrast-adjusted image.

In the present invention, a luminance function proposed by Schreiber is used as the preprocessing step for minimizing irregular edges within the image at the time of extracting edges. The luminance function is expressed by the following Equation, $$S[x, y] = 1 + 99 \frac{\log(1 + I[x, y] \cdot a) - \log(1 + a)}{\log(1 + 100a) - \log(1 + a)} \quad [1]$$

where I[x, y] is a luminance value of an original image, and α is set to 0.05. After Equation [1] is applied, edge detection is performed to obtain spatial masking results. FIG. 3B shows the results of spatial masking proposed in the present invention. It can be seen that the results of FIG. 3B are further improved compared to those of FIG. 3A in which edge detection is performed without using the luminance function.

Hereinafter, motion masking is described. Differently from still image watermarking, moving image watermarking can use the structural characteristics of moving image frames. That is, in a moving image consisting of still images, a region at which a motion exists between consecutive frames provides characteristics suitable to insert a watermark thereinto. First, a luminance difference between corresponding pixels of consecutive frames is obtained to obtain the motion change between the consecutive frames. Thereafter, edges are extracted using a suitable edge detection method. In this case, the above-described Sobel edge detection method can be used. FIG. 4 shows the results of motion masking. As shown in FIG. 4, a higher masking value is assigned to a face part which includes multiple motions.

Hereinafter, global masking modeling is described below. Finally, global masking results can be obtained by combining the frequency masking, spatial masking and motion masking results, obtained in the above procedure, together. First, separate masking results are normalized to be within a certain range, and separate normalized results are combined together. For example, in the prior art, when the results of masking are combined, only a multiplication of them is calculated and used. However, the present invention selects a combination method expressed by Equation [2] so as to apply global masking, in which frequency, spatial and motion masking effects are taken into consideration together, to an image.

$$G = F + S + M \quad [2]$$

where G, F, S and M represent a global masking value, a frequency masking value, a spatial masking value and a motion masking value, respectively.

Figure 5B:

FIGS. 5A and 5B show the global masking results. That is, FIGS. 5A and 5B show the results of global masking of the prior art and the present invention, respectively. It is confirmed that global masking proposed in the present invention enables a large amount of watermark data to be effectively inserted, compared to the prior art.

Hereinafter, a procedure of inserting a watermark according to the present invention is described. In the present invention, a watermark uses a binary level logo image. That is, a result obtained by exclusive-ORing a random sequence generated using a key value set randomly by a user and the binary level logo image becomes a watermark, as shown in Equation [3]. At this time, $X_1$ is the random sequence and $X_2$ is the logo image. $X_1$ has the same size as $X_2$, that is, the size of an original frame, and $X_1$ and $X_2$ are exclusive-ORed in a pixel-by-pixel manner.

$$W = X_1 \oplus X_2 \quad [3]$$

Figure 6:
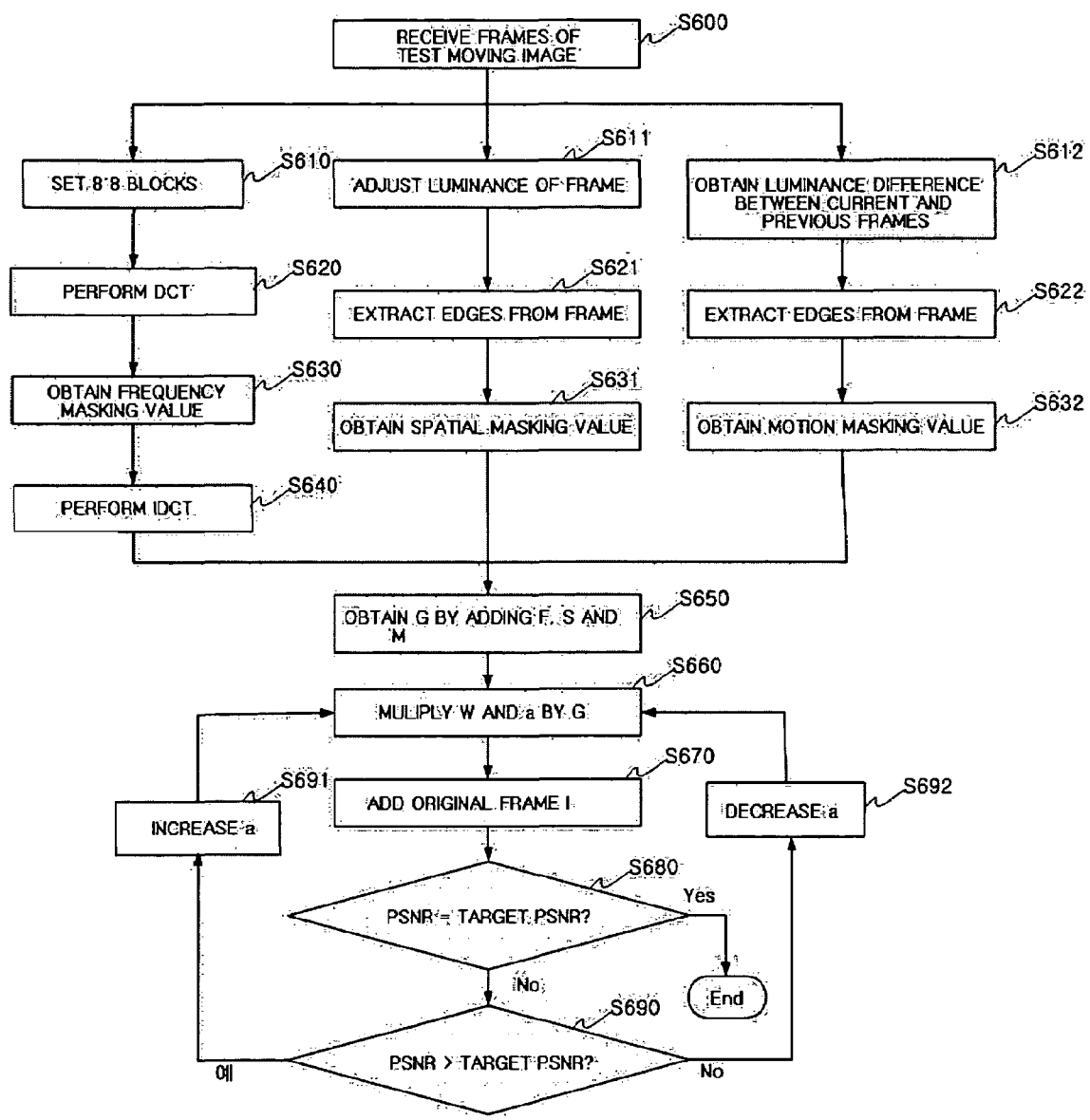
FIG. 6 is a flowchart of a watermarking method according to the present invention.

A procedure of inserting a watermark according to the present invention is shown in FIG. 6. First, frames of a test moving image are received at step S600. Thereafter, separate masking procedures, that is, frequency, spatial, and motion masking procedures, are performed. The procedure for performing frequency masking comprises the steps of dividing each of the frames into 8×8 blocks (S610), performing DCT (S620), obtaining a masking value in a frequency domain from the DCT-transformed results (S630), and obtaining a frequency masking value in a spatial domain by performing IDCT so as to obtain frequency position information in the spatial domain in order to obtain a global masking map in addition to the frequency masking value (S640). Further, the procedure for performing spatial masking comprises the steps of adjusting the contrast of the image to be increased as a preprocessing step for extracting edges (S611), extracting the edges from a frame using a Sobel edge detection method or other methods (S621), and obtaining a spatial masking value from the extracted edges (S631). Further, the procedure for performing motion masking comprises the steps of obtaining a luminance difference between a pixel of a current frame and a corresponding pixel of a previous frame (S612), extracting the edges from the current frame using the Sobel edge detection method or other methods (S622) and obtaining a motion masking value from the extracted edges (S632).

The frequency, spatial and motion masking values obtained in the above procedure are combined together to obtain a global masking value G. At this time, separate masking results are normalized to be within a certain range, and then added to each other at step S650. For example, the separate masking results can be normalized to be values between 0 and 1. A watermark value W is weighted by the global masking value G and a control variable α at step S660, and the watermark value W weighted by G and α is added to the original frame I at step S670. That is, a watermarked frame can be expressed by Equation [4], $$I' = I + \alpha \cdot G \cdot W \quad [4]$$

Where the control variable α is set to "1" as an initial value.

Next, a PSNR value of the watermarked frame is obtained and compared with a target PSNR value at steps S680 and S690, so that the control variable α is suitably adjusted. That is, if the obtained PSNR value is greater than the target value set by the user, α is increased at step S691, while if the obtained PSNR value is less than the target value, α is decreased at step S692. Thereafter, the adjusted α is applied again, so that the value I' is adjusted at step S660. If these operations are repeated and the PSNR value is within a certain error range to such an extent that the PSNR value is almost equal to the target PSNR, the process is completed, and the value I' is fixed according to the process.

A procedure of extracting a watermark inserted in the watermark inserting process is described below. First, the watermarked frame is subtracted from the original frame. A result obtained from this subtraction is the watermark weighted by the global masking value. That is, the weighted watermark can be represented by I−I'=G·W*. Next, the weighted watermark and a random variable obtained by a key value are exclusive-ORed. That is, the exclusive-ORed result can be expressed by $G \cdot W^* \oplus X_1 = X_2^*$, where $X_2^*$ is an extracted logo image.

Hereinafter, the invisibility, the capacity of insertable watermark data, and robustness against various attacks in the watermarking method of the present invention are tested. In order to insert a watermark, an RGB (8 bits/pixel) image was converted to a YUV image. Further, since a typical compression method deteriorates the quality of a luminance component rather than a chrominance component, a watermark is inserted into a Y component, which is a luminance component. FIGS. 7A to 7D are views showing the results of an invisibility test in the watermarking method of the present invention. FIGS. 7A and 7B show an original frame and a watermarked frame, respectively. It can be seen that the watermarked frame visually differs little from the original frame. FIG. 7C shows that the watermarked frame is scaled to display a screen with the inserted watermark. It can be seen that a watermark is concentrated on a region with a high frequency, edges, and a region with fast motion by the global masking map. FIG. 7D shows an extracted logo image.

FIGS. 8A to 8C show the results of a test of the capacity of insertable watermark data on a test frame. When a watermarking system is designed, it is important to insert as much watermark data as possible while maintaining invisibility. For this reason, HVS characteristics are frequently used. In the present invention, a watermark is inserted using a global masking map in which spatial and motion masking effects are taken into consideration as well as a frequency masking effect, thus maximizing the capacity of insertable watermark data. FIG. 8A shows a watermarked image, FIG. 8B shows a watermark extracted by a conventional method using only frequency masking, and FIG. 8C shows a watermark extracted using the watermarking method of the present invention. Consequently, it can be seen that the watermarking method of the present invention can insert more watermark data than the conventional watermarking method.

In order to test the robustness of the proposed watermarking method against MPEG-2 encoding, MPEG-2 encoding of a watermarked frame was carried out while the bit rate was varied, and logo images were extracted with respect to respective cases. Table 1 shows the results obtained by comparing PSNRs of an original test frame and the watermarked frame with each other after the test frame is encoded in MPEG-2 format. The MPEG-2 encoding was carried out while the bit rate was varied to 5 Mbps, 3 Mbps, and 2.5 Mbps.

TABLE 1

|  |  | Bit rate | | |
|---|---|---|---|---|
|  |  | 5 | 3 | 2.5 |
| PSNR [dB] | Test frame | 25.6 | 24.9 | 24.7 |
|  | Watermarked frame | 23.5 | 22.5 | 22.1 |

Figure 9A:
FIGS. 9A to 9C are views showing a logo image extracted from a test frame encoded in MPEG-2 format.
Figure 9B:
Figure 9C:
Figure 10A:
FIGS. 10A to 10D are views showing the results of a robustness test against a frame edition attack.
Figure 10B:
Figure 10C:
Figure 10D:

According to the test results, it can be shown that image quality degradation hardly occurs in the watermarked frame compared to the original moving image frame. FIGS. 9A to 9C show logo images extracted from a test frame encoded (compressed) in MPEG-2 format. It can be seen that there is no problem in extracting logo images with respect to the respective bit rates, even after MPEG-2 encoding. Further, FIGS. 10A to 10D show the results of a robustness test against a frame edition attack. FIG. 10A shows a watermarked image. Although a part of this watermarked image is cut as shown in FIG. 10B, a logo image, extracted after frame edition attack, can be obtained as shown in FIG. 10D, if the cut part is replaced by a part of the original frame existing at the same position as the cut part as shown in FIG. 10C. Even if a user maliciously edits a moving image, the user can cut only an edge part of the moving image, not a center part thereof, thus enabling a logo image to be safely extracted.

As described above, the present invention provides an image watermarking method using an HVS, which can obtain an excellent effect even in an aspect of the capacity of insertable watermark data, as well as an aspect of invisibility, using a global masking map in which the HVS is taken into consideration.

Further, the present invention is advantageous in that it can insert a watermark before encoding by intensifying the robustness of the watermark, thus enabling the watermarking method to be applied to various encoders, such as MPEG-2 and MPEG-4 encoders.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A moving image watermarking method using a human visual system, comprising the steps of:
    a) obtaining a watermark value by exclusive-ORing a random key value and a binary value of a logo image;
    b) separately performing a plurality of masking operations, wherein the plurality of the masking operations are separately performed on identical moving image data;
    c) obtaining a global masking value through the separately performed masking operations;
    d) obtaining a watermarked frame value by adding the watermark value weighted by the global masking value and a control variable, to an original frame value; and
    e) inserting a watermark into a moving image frame using the watermarked frame value.

2. The watermarking method according to claim 1, wherein the step b) further comprises the step of performing a spatial masking operation.

3. The watermarking method according to claim 2, wherein the performing the spatial masking operation comprises the steps of:
    adjusting contrast of the moving image frame; and
    extracting edges from the contrast-adjusted frame.

4. The watermarking method according to claim 2, wherein performing a motion masking operation comprises the steps of:
    obtaining a luminance difference between a current frame and a previous frame; and extracting edges from the current frame.

5. The watermarking method according to claim 2, wherein the step b) further comprises the step of performing a frequency masking operation.

6. The watermarking method according to claim 1, further comprising the step of f) extracting the watermark, the step f) comprising the steps of:

subtracting the watermarked frame value from the original frame value to obtain a subtracted result value; and exclusive-ORing the subtracted result value and a random variable obtained by a key value, and obtaining an exclusive-ORed result.

7. A moving image watermarking method using a human visual system, comprising the steps of:
   a) obtaining a watermark value by exclusive-ORing a random key value and a binary value of a logo image;
   b) separately performing a plurality of masking operations;
   c) obtaining a global masking value through the separately performed masking operations;
   d) obtaining a watermarked frame value by adding the watermark value weighted by the global masking value and a control variable, to an original frame value;
   e) inserting a watermark into a moving image frame using the watermarked frame value;
   f) comparing an image quality of the watermarked frame with an image quality set to a target; and
   g) decreasing the control variable by a predetermined value if the image quality of the watermarked frame is less than the target image quality, and increasing the control variable by a predetermined value if the image quality of the watermarked frame is greater than the target image quality.

8. The watermarking method according to claim 7, wherein the image quality is estimated on the basis of Peak-Signal-to-Noise Ratio (PSNR).

9. A recording medium for storing computer programs for executing a moving image watermarking method using a human visual system, the moving image watermarking method comprising:
   a) obtaining a watermark value by exclusive-ORing a random key value and a binary value of a logo image:
   b) separately performing a plurality of masking operations, wherein the plurality of the masking operations are separately performed on identical moving image data;
   c) obtaining a global masking value through the separately performed masking operations;
   d) obtaining a watermarked frame value by adding the watermark value weighted by the global masking value and a control variable, to an original frame value; and
   e) inserting a watermark into a moving image frame using the watermarked frame value.

* * * * *

UNITED STATES PATENT AND TRADEMARK OFFICE
CERTIFICATE OF CORRECTION

| | | |
|---|---|---|
| PATENT NO. | : 7,581,104 B2 | Page 1 of 1 |
| APPLICATION NO. | : 10/713197 | |
| DATED | : August 25, 2009 | |
| INVENTOR(S) | : Ji-young Moon | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this

Fourteenth Day of September, 2010

David J. Kappos
*Director of the United States Patent and Trademark Office*